United States Patent
Castaldelli et al.

(10) Patent No.: US 12,028,231 B2
(45) Date of Patent: Jul. 2, 2024

(54) PERFORMANCE MEASUREMENT IN A PACKET-SWITCHED COMMUNICATION NETWORK

(71) Applicant: TELECOM ITALIA S.p.A., Milan (IT)

(72) Inventors: Luca Maria Castaldelli, Turin (IT); Luca Fantolino, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 3 days.

(21) Appl. No.: 17/257,689

(22) PCT Filed: Jul. 16, 2019

(86) PCT No.: PCT/EP2019/069096
§ 371 (c)(1),
(2) Date: Jan. 4, 2021

(87) PCT Pub. No.: WO2020/016216
PCT Pub. Date: Jan. 23, 2020

(65) Prior Publication Data
US 2021/0320856 A1    Oct. 14, 2021

(30) Foreign Application Priority Data

Jul. 18, 2018 (IT) .................. 102018000007299

(51) Int. Cl.
*H04L 43/0852* (2022.01)
*H04L 43/026* (2022.01)
(Continued)

(52) U.S. Cl.
CPC ........ *H04L 43/0852* (2013.01); *H04L 43/026* (2013.01); *H04L 45/70* (2013.01); *H04L 49/25* (2013.01)

(58) Field of Classification Search
None
See application file for complete search history.

(56) References Cited

U.S. PATENT DOCUMENTS 8,531,987 B2 * 9/2013 Cociglio ............... H04L 65/762
                                                                    370/252
10,027,567 B2 * 7/2018 Cociglio ............. H04L 43/0858
(Continued)

FOREIGN PATENT DOCUMENTS

EP      2 636 185 A1      9/2013
WO  WO 2011/079857 A1   7/2011
(Continued)

OTHER PUBLICATIONS

International Search Report and Written Opinion dated Sep. 3, 2019 in PCT/EP2019/069096 filed on Jul. 16, 2019.

*Primary Examiner* — Derrick W Ferris
*Assistant Examiner* — Keith Follansbee
(74) *Attorney, Agent, or Firm* — Oblon, McClelland, Maier & Neustadt, L.L.P.

(57) ABSTRACT

It is disclosed a method for performing a performance measurement on a packet flow transmitted through a packet-switched communication network. In the packet flow, first blocks of packets having a first packet feature and second blocks of packets having a second packet feature are provided by periodically switching a packet feature in the packet flow, so that the first blocks of packets alternate in time with the second blocks of packets. Two or more measurement points on the path of the packet flow provide performance parameters relating to the first and second blocks of packets, and alternately provide their values to a network controller, which the controller uses to perform the performance measurement. The periodic switching of the packet feature and the alternate provision of the performance (Continued)

parameter values are in response to remote commands received from the controller.

15 Claims, 4 Drawing Sheets

(51) Int. Cl.
    *H04L 45/00*     (2022.01)
    *H04L 49/25*     (2022.01)

(56) References Cited

U.S. PATENT DOCUMENTS

| | | | |
|---|---|---|---|
| 2012/0275333 A1 | 11/2012 | Cociglio | |
| 2014/0160975 A1* | 6/2014 | Cociglio | H04L 43/0829 370/252 |
| 2015/0236936 A1* | 8/2015 | Waldbusser | H04L 43/20 370/252 |
| 2017/0244623 A1 | 8/2017 | Cociglio | |

FOREIGN PATENT DOCUMENTS

| | | |
|---|---|---|
| WO | WO 2012/059138 A1 | 5/2012 |
| WO | WO 2015/090364 A1 | 6/2015 |
| WO | WO 2018/050215 A1 | 3/2018 |

\* cited by examiner

| block period | start time | connection |
|---|---|---|
| T1 | 0 | A |
| T2 | Tb | B |
| T3 | 2Tb | A |
| T4 | 3Tb | B |
| ⋮ | ⋮ | ⋮ |
| Tn-1 | (n-2)Tb | A |
| Tn | (n-1)Tb | B |

TT

PERFORMANCE MEASUREMENT IN A PACKET-SWITCHED COMMUNICATION NETWORK

TECHNICAL FIELD

The present invention relates to the field of communication networks. In particular, the present invention relates to a method for performing a performance measurement in a packet-switched communication network, and to a packet-switched network configured to implement such method.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

Moreover, each packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

EP 2 636 185 (in the name of the same Applicant) discloses a method for performing packet loss measurements and/or delay/jitter measurements on a packet flow transmitted from a first node to a second node. The first node marks each packet to be transmitted by applying thereto a marking value "1" or "0" (e.g. by writing it in the packet header). The first node periodically switches the applicable marking value between "1" or "0" with a certain period Tb (also termed "block period", for example 5 minutes). The first node also provides a couple of counters C1 and C0 that count the number of transmitted packets marked by "1" and "0", respectively. On the other hand, the second node provides a couple of counters C1' and C0' that count the number of received packets marked by "1" and "0", respectively. Hence, during block periods wherein the applicable marking value is "1", the values of the counters C1 and C1' increase (if there are packets to be transmitted), while the values of the counters C0 and C0' are constant. Conversely, during block periods wherein the applicable marking value is "0", the values of the counters C0 and C0' increase (if there are packets to be transmitted) while the values of the counters C1 and C1' are constant. During each block period, the first node and the second node transmit to a management server the values of the currently constant counters C1 and C1' or C0 and C0', respectively. The management server then uses the received values of the counters C1 and C1' or C0 and C0' to calculate the packet loss for that block period.

According to EP 2 636 185, both the first node and the second node use their local clocks to determine the applicable marking value "1" or "0" and the counter C1/C1' or C0/C0' whose value is currently constant and shall accordingly be sent to the management server. According to an embodiment, for the purpose of making the respective determinations, both the first node and the second node compares the time as indicated by its own local clock with a pre-configured, locally stored timing table indicating a sequence of predefined block period start times and respective applicable marking values. When the local clock value equals one of the predefined start times, the node determines the beginning of a new block period. The node then reads in the locally stored timing table the applicable marking value and infers therefrom the counter whose value is currently constant and shall then be sent to the management server.

SUMMARY OF THE INVENTION

The Applicant has perceived the need to improve the technique disclosed by EP 2 636 185.

In particular, the Applicant has realized that, in some situations, it may be desirable to dynamically adjust the duration of the block period Tb. For example, due to detection of an anomalous packet loss, the network manager might wish to temporarily make the packet loss measurements more frequent by reducing the value of Tb, e.g. from 5 minutes to 10 seconds, in order to speed up the identification of the problem. The technique of EP 2 636 185 is not optimal in this respect, because changing the value of Tb requires changing configuration of each node involved in the measurement, e.g. by loading a new timing table whose block period start times are calculated using the new value of Tb. Changing a node configuration is however a burdensome operation, which is typically performed occasionally. Hence, frequent changes of the marking period Tb to dynamically adapt its value according to events occurring in the network are practically unfeasible.

More generally, the Applicant has noticed that such node configuration based implementation of the performance measurement technique of EP 2 636 185 appears to be not compliant with the increasingly used SDN (Software Defined Network) architecture. As known, SDN is a paradigm aiming at increasing dynamicity, manageability and adaptability of communication networks, which provides for decoupling network control and forwarding functions, so that the network control becomes directly programmable. According to the SDN paradigm, the network intelligence is centralized in SDN controllers that maintain a global view of the network. The network manager may configure, manage and optimize network resources via dynamic, automated SDN programs, which it can write itself. It is therefore apparent that the above configuration-based implementation of the performance measurement goes in a different direction with respect to that of the SDN paradigm.

In view of the above, the Applicant has tackled the problem of providing a method for performing a performance measurement in a packet-switched communication network, which—consistently with the SDN paradigm—allows the network manager controlling and adjusting the parameters of the performance measurement (in particular, but not exclusively, the block period Tb) in a dynamic and flexible way.

In the following description and in the claims, the expression "performing a performance measurement in a packet-switched communication network" will designate an operation of measuring a packet loss and/or a delay and/or a jitter undergone by packets of a packet flow transmitted from a transmitting node to a receiving node of the packet-switched communication network.

Further, in the present description and in the claims, the expression "periodically switching a packet feature in the packet flow" designates an operation of periodically changing a certain feature of packets comprised in the packet flow to be measured. By way of non limiting example, such packet feature may be a packet marking value (e.g. the value of a dedicated field in the packet header) which is periodically switched e.g. between a first marking value and second marking value. As another example, the packet feature may be the value of a field comprised in an encapsulation header (e.g. a tunnel header) prefixed to the packet, which is periodically switched e.g. between two alternative values identifying e.g. two logical connections implemented on a same physical connection. As another example, the packet feature may be the physical connection carrying the packet, which is periodically switched e.g. between a first physical connection and a second physical connection. It may be appreciated that, while in the first two exemplary cases (marking values and logical connections) the packet flow to be measured is divided only from the logical point of view, in the latter case the packet flow to be measured is physically split so that its packets may follow different paths between the nodes originating and terminating the physical connections.

Further, it shall be noticed that, though for simplicity herein below it is assumed that the packet feature is periodically switched between a first packet feature and a second packet feature (e.g. a first and second marking values, a first and second logical or physical connections, etc.), this is not limiting. The packet feature may indeed be switched within a set of three of more packet features (e.g. three or more marking values, three or more logical or physical connections, etc.), which are cyclically applied to the packets of the packet flow.

According to embodiments of the present invention, the above problem is solved by a method wherein, in the packet flow to be measured, first blocks of packets having a first packet feature and second blocks of packets having a second packet feature are provided, which are interleaved in time and distinguishable from each other, by periodically switching a packet feature in the packet flow. At least two measurement points are provided on the path of the packet flow to be measured, each measurement point providing two performance parameters, one relating to the packets of the first blocks (namely, having the first packet feature) and the other one relating to the packets of the second blocks (namely, having the second packet feature). Each measurement point alternately provides to a controller the values of the two performance parameters. According to embodiments of the present invention, the periodic switching of the packet feature and the alternate provision of the value of one of the two performance parameters generated by each measurement point are in response to a remote command periodically generated by the controller.

Hence, the periodic behavior of the nodes involved in the performance measurement is not due to the nodes configuration, but is instead regulated by a flow of remote commands that the controller periodically sends to the involved nodes, which then apply the proper packet feature and provide to the controller the value of the proper performance parameter in response to such remote commands.

This is advantageous in that the nodes do not need to be configured for the purpose of implementing the performance measurement. This makes the method of the invention easier to deploy than the configuration-based method of EP 2 636 185.

Besides, consistently with the SDN paradigm, the network manager may control and adjust the parameters of the performance measurement in a dynamic and flexible way. In particular, in order to change the value of Tb, no reconfiguration of the nodes involved is required. The value of Tb may indeed be changed centrally at the controller. This change will result in a change of the periodicity of the flow of remote commands issued by the controller and, consequently, in a change of the periodicity of the behaviour of the involved nodes. The value of Tb may therefore be adjusted as often as necessary, according to the needs arising in every specific network scenario.

The method of the invention exhibits further advantages.

First of all, it maintains full compliance with the technique of EP 2 636 185. In particular, a communication network may comprise nodes configured to operate according to EP 2 636 185 and nodes implementing instead the method according to embodiments of the present invention. A same node may also implement both the methods, the choice being of the network manager depending on the needs.

Moreover, the high flexibility in controlling and adjusting the measurement parameters allows implementing more complex performance measurement schemes. For instance, the involved nodes may be remotely controlled to apply a certain block period Tb along a portion of the path followed by the packet flow to be measured and, at the same time, another block period Tb' along another portion of the path. Alternatively or in combination, the involved nodes may be remotely controlled to periodically switch the packet feature every Tb and send instead the values of the proper counters with a period different from Tb.

According to a first aspect, the present invention provides a method for performing a performance measurement on a packet flow transmitted through a packet-switched communication network, the method comprising:

a) in the packet flow, providing first blocks of packets having a first packet feature and second blocks of packets having a second packet feature, the first blocks of packets alternating in time with the second blocks of packets, by periodically switching a packet feature in the packet flow;

b) at each one of at least two measurement points located on the path of the packet flow, providing two performance parameters relating to the first blocks of packets and the second blocks of packets respectively, and alternately providing to a controller of the packet-switched communication network the values of the two performance parameters; and c) performing the performance measurement based on the values of the two performance parameters received from the at least two measurement points, wherein the periodically switching the packet feature and the alternately providing the values of the two performance parameters are in response to remote commands received from the controller.

Preferably, each remote command comprises at least one of:
a switch instruction configured to trigger a switching of the packet feature in the packet flow;
a read instruction configured to trigger provision to the controller of a current value of one of the two performance parameters.

Preferably, the switch instruction comprises criteria allowing identification of the packet flow amongst all traffic exchanged in the packet-switched communication network.

Preferably, the read instruction comprises an address to which the current value of one of the two performance parameters shall be sent.

Preferably, the switch instruction and the read instruction are formatted according to different protocols.

Preferably, the controller sends to a node of the packet-switched communication network implementing step a) a switch instruction when, based on a local clock, it determines that a block period is starting and that, accordingly, the packet feature shall be switched in the packet flow.

Optionally, the method comprises varying the block period at the controller.

According to an embodiment, the controller sends to the at least two measurement points located on the path of the packet flow respective read instructions periodically, with a period equal to the block period.

According to a variant, the switch instruction and the read instructions are sent by the controller to the node and to the at least two measurement points, respectively, substantially at the same time.

Optionally, execution of the read instructions by the at least two measurement points is delayed by a safety wait time $T_{SW}$ relative to the reception time of said read instructions at the at least two measurement points.

According to another variant, the switch instruction and the read instructions are sent by the controller to the node and to the at least two measurement points, respectively, at different times, sending the read instructions being delayed by a safety wait time $T_{SW}$ relative to sending of the switch instruction.

According to other embodiments, the controller sends to measurement points located on at least a portion of the path of the packet flow respective read instructions periodically, with a period equal to an integer multiple of the block period.

Preferably, at step a) the packet feature is the connection carrying packets of the packet flow.

Preferably, the two performance parameters relating to the first blocks of packets and the second blocks of packets, respectively, comprise at least one of:
two counters counting the number of packets comprised in the first blocks of packets and the second blocks of packets, respectively;
two timestamps indicating the transmission or reception times of a certain packet of each first block of packets and each second block of packets, respectively; and
two average timestamps indicating average transmission or reception times of all the packets comprised in the first blocks of packets and the second blocks of packets, respectively.

According to a second aspect, the present invention provides a packet-switched communication network configured to implement a performance measurement on a packet flow transmitted through the packet-switched communication network, the network comprising:
a) a first node configured to provide, in the packet flow, first blocks of packets having a first packet feature and second blocks of packets having a second packet feature, the first blocks of packets alternating in time with the second blocks of packets, by periodically switching a packet feature in the packet flow;
b) at least two measurement points located on the path of the packet flow, each one of the at least two measurement points being configured to provide two performance parameters relating to the first blocks of packets and the second blocks of packets, respectively, and to alternately provided the values of the two performance parameters; and
c) a controller configured to perform the performance measurement based on the values of the two performance parameters received from the at least two measurement points,
wherein the first node and the at least two measurement points are configured to periodically switch the packet feature and alternately provide the values of the two performance parameters, respectively, in response to remote commands received from the controller.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
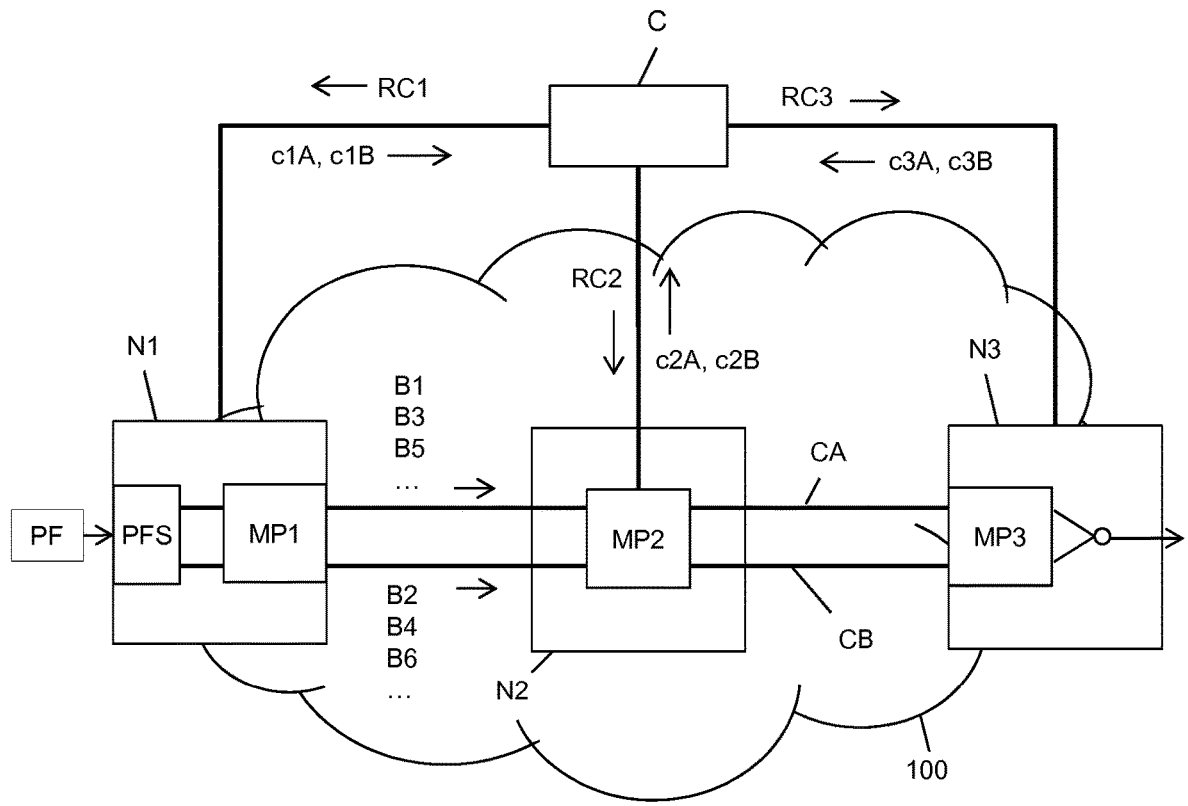
FIG. 1 schematically shows a packet-switched communication network in which the method for performing performance measurements according an embodiment of the present invention is implemented.

FIG. 1 schematically shows a communication network 100 in which the method according to an embodiment of the present invention is implemented. The communication network 100 preferably is a packet-switched communication network, e.g. an IP network.

The communication network 100 comprises a plurality of nodes reciprocally interconnected by physical links according to any known topology, including nodes N1 and N3 shown in FIG. 1. The nodes N1 and N3 are connected by a physical link, e.g. an optical link. The physical link may be direct, namely the nodes N1 and N3 may be adjacent. Alternatively, as depicted in FIG. 1, the physical link between the nodes N1 and N3 may comprise a concatenation of several physical links, namely one or more intermediate nodes—including the node N2 shown in FIG. 1—are located between N1 and N3.

Figure 2:
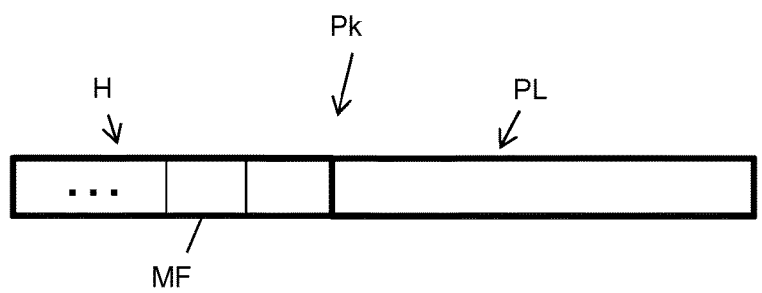
FIG. 2 schematically shows the structure of a packet exchanged in the communication network of FIG. 1, according to embodiments of the present invention.

The communication network 100 supports transmission of a packet flow PF. The packet flow PF comprises a flow of packets Pk, e.g. IP packets. As schematically depicted in FIG. 2, each packet Pk comprises a header H and a payload PL. The payload PL comprises user data. The header H comprises information for routing the packet Pk. The header format depends on the protocol according to which the packets Pk are formatted (e.g. IPv4 or IPv6). In any case, the header comprises the source address of the packet and the destination address of the packet.

The packet flow PF may be a point-to-point packet flow, namely a packet flow entirely built up of packets Pk having a same source address and a same destination address, whose path across the communication network 100 comprises at least the physical link linking the nodes N1 and N3 through the node N2.

Alternatively, the packet flow PF may be a multipoint packet flow, namely a packet flow comprising packets Pk having different sources addresses and/or different destination addresses and whose paths share at least the physical link linking the nodes N1 and N3 through the node N2. For instance, the packet flow PF may comprise packets Pk having a same source address but different destination addresses, or packets having a same destination address but different source addresses.

Assuming that a performance measurement of the packet flow PF is to be made between the nodes N1 and N3, the node N1 preferably divides the packet flow PF into first blocks of packets B1, B3, B5, etc. and second blocks of packets B2, B4, B6, etc. which are interleaved in time and distinguishable from each other, by periodically switching a packet feature.

As mentioned above, the packet feature may be the value of a dedicated field in the header H (e.g. the marking filed MF shown in FIG. 2), which the node N1 periodically switches e.g. between a first marking value and second marking value (or amongst three or more marking values).

According to the embodiment shown in FIG. 1 and described herein below, instead, the packet feature is the connection carrying the packets Pk between N1 and N3, which is periodically switched between a first connection CA carrying the first blocks of packets B1, B3, B5, etc. and a second connection CB carrying the second blocks of packets B2, B4, B6, etc. As mentioned above, this is not limiting, since the connection could be cyclically switched amongst three or more connections, each one carrying respective blocks of packets of the packet flow PF.

It shall be noticed that switching connection for dividing the packet flow PF into alternate blocks of packets is particularly advantageous over e.g. the packet marking technique. First of all, there is no need to modify the packet structure and content. Also the impact on the nodes is minimum, the only static intervention required being the setting up of the two connections CA, CB, which may be then used for several packet flows to be measured. Further, only the node N1 needs to be configured to originate the connections CA, CB, the other nodes being unaffected.

The connections CA, CB may be implemented according to any protocol of layer 2, layer 3 or layer 4. The connections CA, CB may be physical or logical connections. The connections CA, CB may be e.g. fiber optic connections, VLANs or GRE tunnels. Each connections may comprise different links forming a bundle (e.g. using ECMP): in such case the nodes have to gather aggregated measurements over the bundle. Each connection CA, CB may be identified by a respective identifier A, B.

The connections CA, CB are originated by the node N1 and terminated by the node N3, which are therefore termed herein after also "originating node" and "terminating node", respectively. As far as the node N2 is concerned (which will be termed herein after also "intermediate node"), it is preferably configured to segregate the connections CA, CB, namely to keep the packets transmitted by each connection CA, CB separate from those transmitted by the other one. According to embodiments not shown in the drawings, each connection CA, CB may follow a separate path from N1 to N3, namely cross different intermediate nodes.

In any case, the connections CA and CB preferably have a same latency, in order not to introduce reception sequence reordering at the node N3.

For the purpose of dividing the packet flow PF using the connections CA, CB, the node N1 preferably comprises a packet flow splitter PFS capable of switching the connection CA, CB which shall transmit the packets Pk.

Further, at each node N1, N2, N3, a measurement point MP1, MP2, MP3 is preferably implemented. Each measurement point MP1, MP2, MP3 is preferably configured to provide at least two performance parameters, one relating to packets Pk transmitted by the connection CA and the other one relating to packets Pk transmitted by the connection CB.

The communication network 100 also comprises a controller C communicating with the network nodes, including the nodes N1, N2, N3. For instance, the controller C may be part of a SDN (Software Defined Network) controller.

According to embodiments of the present invention, the controller C transmits to the nodes involved in the performance measurement of the packet flow PF (namely, N1, N2 and N3 in the considered embodiment) a flow of remote commands periodically generated and suitable for remotely controlling the operation of the packet flow splitter PFS and the measurement points MP1, MP2, MP3. As it will be described in detail herein after, indeed, the packet flow splitter PFS switches the connection CA, CB which shall transmit the packets Pk upon reception of a remote command from the controller C, while the measurement points MP1, MP2, MP3 transmit to the controller C the values of the respective performance parameters in response to a remote command from the controller C.

The flow of remote commands from the controller C preferably has a period Tb, which corresponds to the block period (namely, the duration of each block of packets B1, B2, B3, B4, B5, B6, etc.) and to the measurement period.

The block period Tb may be set by the network operator, according to the desired performance measurement frequency. For instance, Tb may be set equal to 5 minutes.

According to an embodiment of the present invention, in addition to the block period Tb, the network operator preferably sets a period Tm. The period Tm and the block period Tb are preferably selected so that the following equation is fulfilled:

$$Tm = n \times Tb, \quad [1]$$

where n is an even integer equal to or higher than 2, and Tm and Tb are expressed in a same unit of measurement (e.g. minutes or seconds). For instance, the period Tm may be equal to 60 minutes, and the block period Tb may be equal to e.g. 1, 2, 3, 5, 6, 10, 12, 15 or 30 minutes (i.e. all the values fulfilling the above equation [1] when Tm and Tb are expressed in minutes). The period Tm then comprises an even integer number n of block periods T1, T2, T3, T4, . . . Tn−1, Tn.

Figures 3, 4:
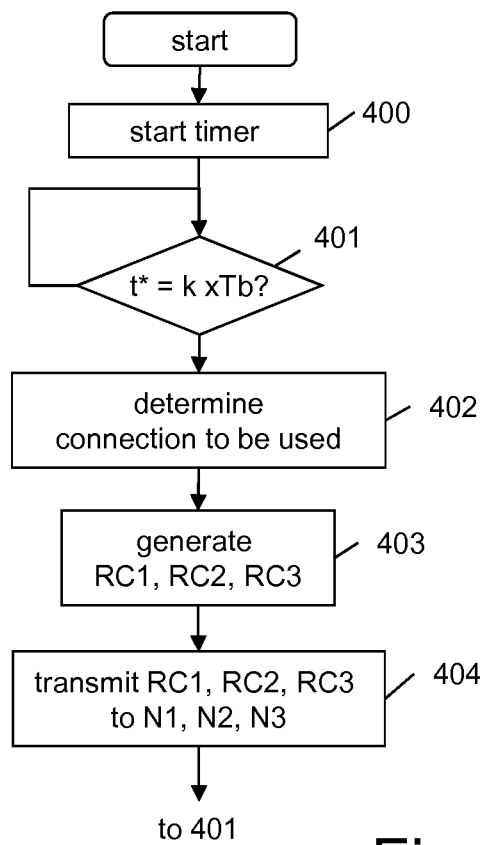
FIG. 3 is an exemplary timing table used by the controller for generating the remote commands.
FIG. 4 is a flow chart of the operation of the controller, according to an embodiment of the present invention.

Based on the values of Tb and Tm set by the network operator, the controller C preferably generates a timing table TT, schematically depicted in FIG. 3.

The timing table TT preferably comprises n rows, i.e. one row per each block period T1, T2, T3, T4, . . . Tn−1, Tn. Each row comprises the start time k×Tb (with k=0, 1 . . . n−1) of the corresponding block period and the value to which the packet's feature (in the described embodiment, an identifier A or B of the connection CA or CB which shall carry the packet Pk) shall be set during the corresponding block period. The timing table TT is preferably stored at the controller C.

With reference now to the flow chart of FIG. 4, when the controller C determines that a performance measurement relative to the packet flow PF has to be started, it preferably starts a timer cyclically counting from 0 to Tm (step 400). For instance, if Tm is equal to 60 minutes, the transmission timer may cyclically count from 00:00 to 59:59.

When the current time t* indicated by the timer of the controller C becomes equal to anyone of the block period start times k×Tb as indicated in the timing table TT (step 401), the controller C preferably determines the connection CA or CB to be used for transmitting the packets Pk of the packet flow PF during the starting block period (step 402). For this purpose, the controller C preferably reads the connection identifier A or B contained in the corresponding row in the timing table TT.

Then, the controller C preferably generates a remote command RC1, RC2, RC3 for each node N1, N2, N3 involved in the performance measurement (step 403). Each remote command RC1, RC2, RC3 preferably comprises one or more instructions executable by the nodes N1, N2, N3. Such executable instructions preferably comprise:
  (i) a switch instruction: it is configured to command the packet flow splitter PFS to switch transmission of the packets Pk to the connection CA or CB as read in the timing table TT, until a further switch instruction is provided; and
  (ii) a read instruction: it is configured to command the measurement point MP1, MP2, MP3 to provide to the controller C the current value(s) of the performance parameter(s) relating to packets Pk transmitted by the connection CB or CA other than that read in the timing table TT.

Hence, with reference to the exemplary timing table TT of FIG. 3, when the current time t* becomes equal to an even multiple of the block period duration Tb, the switch instruction is configured to command the packet flow splitter PFS to switch transmission of the packets Pk to the connection CA and the read instruction is configured to command the measurement points MP1, MP2, MP3 to provide to the controller C the value(s) of the performance parameter(s) relating to packets Pk transmitted by the connection CB.

Conversely, when the current time t* becomes equal to an odd multiple of the block period duration Tb, the switch instruction is configured to command the packet flow splitter PFS to switch transmission of the packets Pk to the connection CB and the read instruction is configured to command the measurement points MP1, MP2, MP3 to provide to the controller C the value(s) of the performance parameter(s) relating to packets Pk transmitted by the connection CA.

Preferably, in relation to packet flow PF sharing the link from node N1 to node N3, the remote command RC1 addressed to the originating node N1 comprises a switch instruction and a read instruction, while each remote command RC2, RC3 basically comprises only a read instruction.

Each remote command RC1, RC2, RC3 may comprise additional information which the nodes N1, N2, N3 need to carry out their task. For example, the switch instruction may specify identification criteria (e.g. source address and/or destination address) allowing the node N1 to identify the packets Pk belonging to the packet flow PF to be measured amongst all the incoming packets. As a further example, the read instruction may comprise an address to which the value(s) of the performance parameter(s) shall be sent by the measurement points MP1, MP2, MP3.

Each remote command RC1, RC2, RC3 may be generated as a unique command comprising all the needed executable instructions. Alternatively, each remote command RC1, RC2, RC3 may be split into separate sub-commands, each one comprising a single executable instruction.

The remote commands RC1, RC2, RC3 may be formatted according to network protocols such as for instance Open-Flow, NETCONF, XMPP (eXtensible Messaging and Presence Protocol), OVSDB (Open vSwitch Database Management Protocol), MPLS-TP (MPLS Trasport Profile) or BGP (Border Gateway Protocol).

A single protocol may be used for the remote commands RC1, RC2, RC3. Alternatively, if separate sub-commands are used, different protocols may be used for different sub-commands. For instance, the switch instruction may be sent using an IP routing protocol (e.g. BGP), or a layer 2 signalling protocol (e.g. LDP) or a fabric-switching control protocol (e.g. Open Flow). As far as the read instruction is concerned, CLI commands, SNMP read operations may be used.

Use of BGP (Border Gateway Protocol) for implementing the switch instruction is particularly advantageous, because IPS IP networks already extensively use this protocol and are typically provided with route reflectors which efficiently distribute BGP messages to a large number of nodes. This may advantageously reduce to a great extent the computational effort required at the controller C to distribute the remote commands RC1, RC2, RC3.

For instance, connection switching based on BGP may be performed as follows:
  set up static routes to a route (path BASE, corresponding e.g. to the connection CA). This provides connectivity even in absence of any routes learned from BGP announcements;
  set up static routes to a destination "fake" address α (namely an address that does not correspond to any device) to an alternative route (path ALT, corresponding to the connection CB);
  through a BGP announcement, the controller C announces a route for the packet flow PF that indicates as next-hop the address α. The BGP announcement has precedence over the static route set for the path BASE (any known technique may be used for this purpose, including manipulation of the metrics, or proper prefix-length choice); and
  the BGP announcement is generated by the controller C and withdrawn in alternate block periods. The node N1 then modifies the forwarding table to use the path BASE (connection CA) or the path ALT (connection CB) accordingly.

It may be appreciated that use of the "fake" address α maximizes the efficiency on the control plane. This address may be indeed used to steer packet flows on every node in the network 100. Hence, a single BGP announcement propagated in the network 100 (e.g. leveraging route reflectors) may result in a connection switching at several nodes of the network, which is advantageous if several packet flows have to be measured at the same time. This is however not limiting, since it is also possible to provide different BGP announcements, e.g. if several packet flows need to be measured with different block periods Tb.

In order to generates the BGP announcements, a node of the network 100 may be used as a BGP speaker (node not directly involved in the performance measurement), configured with a phyton script. In order to implement the connection switching, the script sets and deletes alternatively the configuration on the speaker node so that the BGP announcement is generated and withdrawn with the proper block period Tb. In addition, the python script may also comprise a transmit instruction.

Referring again to the flow chart of FIG. 4, the controller C preferably transmits the remote commands RC1, RC2, RC3 to the respective nodes N1, N2, N3 (step 404).

If each remote command RC1, RC2, RC3 is split into separate sub-commands, at step 404 all the sub-commands forming a same remote command RC1, RC2, RC3 may be transmitted by the controller C substantially at the same time, namely upon detection that the current time t is equal to the start time k×Tb of a block period.

Alternatively, the sub-commands forming a same remote command RC1, RC2, RC3 may be transmitted at different times. In particular, transmission of the sub-command comprising the read instruction may be delayed—relative to the start time k×Tb of a block period and the transmission of the sub-command comprising the switch instruction—by a safety wait time $T_{SW}$. This guarantees that the values of the performance parameters relating to packets Pk transmitted by the connection CB or CA other than that read in the timing table TT are provided to the controller C only after the packet flow splitter PFS has actually switched transmission of the packets Pk to the connection CA or CB as read in the timing table TT and, hence, they are actually constant.

The safety wait time $T_{SW}$ is preferably comprised between a minimum and a maximum value. The minimum value is equal to the value that guarantees that every packets belonging to the block period has been counted. A possible value for this purpose may be the maximum OWD plus the maximum propagation time of the remote command generated by the controller C. The maximum value is lower than Tb decremented by the elaboration time of the node and the maximum propagation time of the remote command generated by the controller, so that the counter is read before any packet of the new block period has been generated. A possible value for this purpose is typically 50% of Tb.

The minimum value may be equal to e.g. 1% of the block period Tb. For instance, if the block period Tb is equal to 10 minutes, the safety wait time $T_{SW}$ may be equal to e.g. 3 minutes.

If the read instruction is instead sent together with the switch instruction (either within the same remote command or as separate sub-commands transmitted substantially at the same time), in order to guarantee that the measurement points MP1, MP2, MP3 execute the read instruction after the packet flow splitter PFS has actually switched transmission of the packets Pk to the connection CA or CB as read in the timing table TT, the read instruction may contain a command for delaying its own execution by a safety wait time $T_{SW}$, or each measurement point MP1, MP2, MP3 may be configured to delay execution of the respective read instruction by a safety wait time $T_{SW}$ relative to its reception time. In any case, it may be appreciated that the execution of the read instruction is delayed by the safety wait time $T_{SW}$ plus transmission delay of the read instruction from the controller C to the node and processing time at the node.

Figure 5:
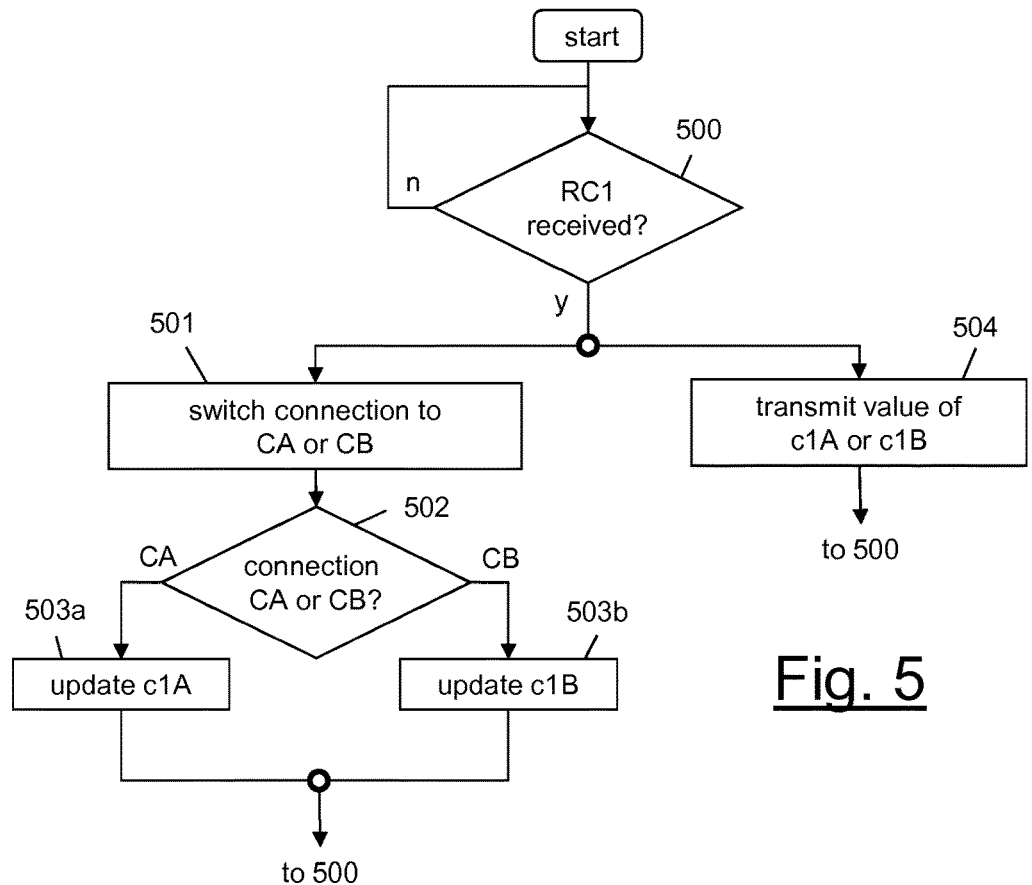
FIGS. 5 and 6 are flow charts of the operation of the nodes of the network of FIG. 1, according to embodiments of the present invention.
Figure 6:
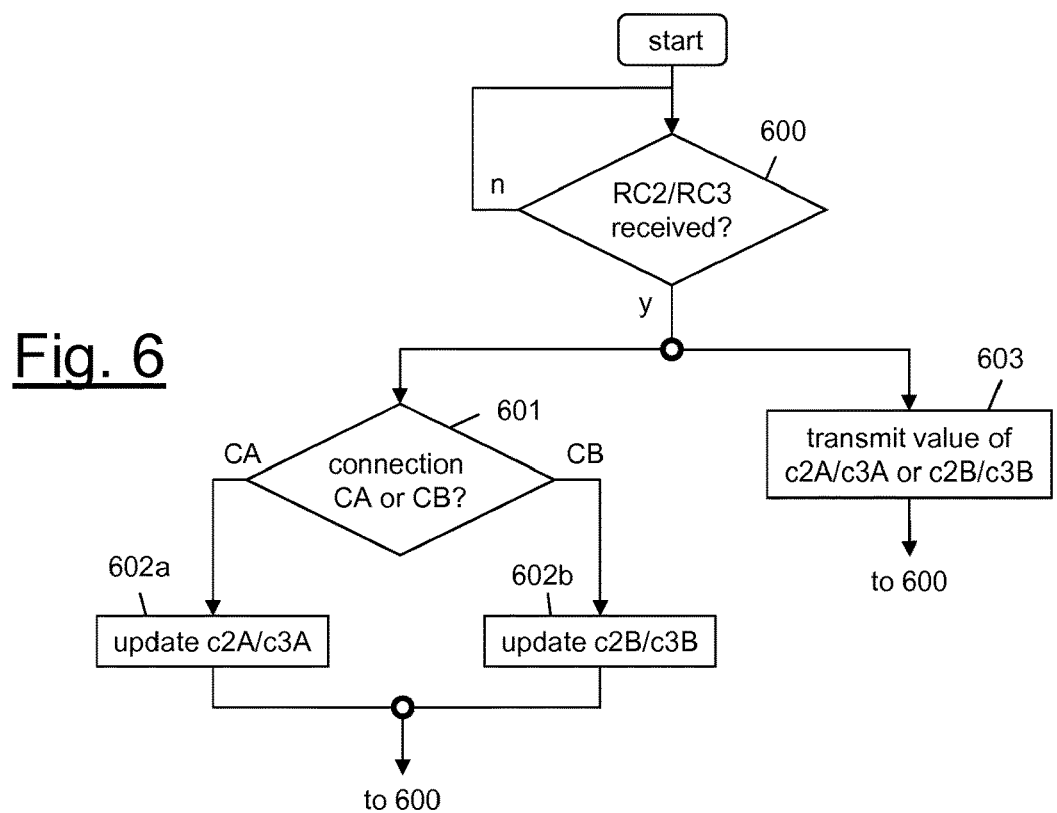

Steps 401-404 are periodically iterated by the controller C until the end of the performance measurement session, each iteration being triggered by the start time of a respective block period T1, T2, . . . Tn. The end of the performance measurement session may be triggered either manually by the network operator, or automatically by configuring the controller C to perform a predefined number of iterations of steps 401-404. Therefore, the controller C transmits to each node N1, N2, N3 a remote command RC1, RC2, RC3 for every block period Tb, which contains executable instructions inducing the nodes N1, N2, N3 to implement a performance measurement on the packet flow PF, as it will be described in detail with reference to the flow charts of FIGS. 5-6.

With reference first to the originating node N1 (FIG. 5), as it receives a remote command RC1 from the controller C (step 500), its packet flow splitter PFS executes the switch instruction comprised in the remote command RC1, namely it switches transmission of the packets Pk to the connection CA or CB specified by the switch instruction (step 501).

Hence, by referring to the timing table TT of FIG. 3, upon reception of remote commands RC1 generated when the time t* indicated by the timer of the controller C becomes equal to an even multiple of Tb, the packet flow splitter PFS switches transmission of the packets Pk to the connection CA. Conversely, upon reception of remote commands RC1 generated when the time t* indicated by the timer of the controller C becomes equal to an odd multiple of Tb, the packet flow splitter PFS switches transmission of the packets Pk to the connection CB. Therefore, during block periods starting at even multiples of Tb the connection CA transmits blocks B1, B3, B5, etc. of packets Pk, while during block periods starting at odd multiples of Tb the connection CB transmits blocks B2, B4, B6, etc. of packets Pk. All the blocks have the same duration Tb, but they may comprise different numbers of packets Pk.

Further, upon reception of the first remote command RC1, the measurement point MP1 preferably initializes at least one couple of performance parameters relating to packets transmitted by the connection CA or CB, respectively. The performance parameters may be for instance a couple of counters c1A and c1B counting the number of packets transmitted on the connections CA and CB, respectively, as schematically depicted in FIG. 1. This is however not limiting. According to embodiments of the present invention, in addition or as alternative to the counters c1A, c1B the measurement point MP1 may also provide a couple of timestamps indicating the transmission times of e.g. the first packet Pk transmitted on the connections CA and CB, respectively, after each connection switching performed by the packet flow splitter PFS. Furthermore, in addition or as alternative, the measurement point MP1, MP2 may also provide a couple of average timestamps indicating the average transmission times of all the packets Pk transmitted on the connections CA and CB, respectively, between two consecutive connection switching performed by the packet flow splitter PFS.

Then, if the packet transmission has been switched to the connection CA (step 502), the measurement point MP1 starts updating the performance parameter relating to the packets Pk transmitted by the connection CA (step 503a). In particular, if the performance parameter is the above cited counter c1A, the measurement point MP1 preferably increases by one the value of the counter c1A for each packet Pk transmitted by the connection CA.

Otherwise, if the packet transmission has been switched to the connection CB (step 502), the measurement point MP1 starts updating the performance parameter relating to the packets Pk transmitted by the connection CB (step 503*b*). In particular, if the performance parameter is the above cited counter c1B, the measurement point MP1 preferably increases by one the value of the counter c1B for each packet Pk transmitted by the connection CB.

While the packet flow splitter PSF is transmitting the packets Pk on the connection CA or CB as specified in the switch instruction comprised in the received remote command RC1, the measurement point MP1 preferably executes the read instruction comprised in the remote command RC1, by providing to the controller C the value of the performance parameter (in particular, of the counters c1A or c1B) specified by the read instruction (step 504).

Hence, by referring to the timing table TT of FIG. 3, upon reception of remote commands RC1 generated when the time t* indicated by the timer of the controller C becomes equal to an even multiple of Tb, the measurement point MP1 provides to the controller C the value of the counter c1B relating to packets Pk transmitted on the connection CB, which currently has a constant value. Conversely, upon reception of remote commands RC1 generated when the time t* indicated by the timer of the controller C becomes equal to an odd multiple of Tb, the measurement point MP1 provides to the controller C the value of the counter c1A relating to packets Pk transmitted on the connection CA, which currently has a constant value.

The execution of the read instruction by the measurement point MP1 is preferably delayed by a safety wait time $T_{SW}$ as described above, in order to guarantee that the value of the counter c1A or c1B sent to the controller C is actually constant.

As far as the nodes N2 and N3 are concerned (FIG. 6), upon reception of the first respective remote command RC2/RC3 from the controller C, the measurement point MP2/MP3 preferably initializes at least one couple of performance parameters relating to packets transmitted by the connection CA or CB, respectively. The performance parameters may be for instance a couple of counters c2A/c3A and c2B/c3B counting the number of packets transmitted on the connections CA and CB, respectively, as schematically depicted in FIG. 1. However, similarly to what discussed in detail above with reference to the originating node N1, in addition or as alternative to the counters, the measurement point MP2/MP3 may also provide timestamps and/or average timestamps.

It shall be noticed that, at the intermediate node N2, the measurement point MP2 may be implemented on the reception side, so that its performance parameters relate to the packets Pk as received from the node N1 on the connection CA or CB. Alternatively, the measurement point MP2 may be implemented on the transmission side, so that its performance parameters relate to the packets Pk as transmitted to the node N3 on the connection CA or CB. As a further alternative, the intermediate node N2 may be provided with two measurement points MP2, MP2', one on the reception side and one on the transmission side, providing separate performance parameters relating to packets Pk as received from N1 and as transmitted to N3, respectively (see FIG. 7).

It shall further be noticed that, if the connections CA and CB are separate physical connections, the measurement point MP2 shall be duplicated, namely a measurement point MP2 shall be provided on the connection CA to provide performance parameters relating to the blocks of packets B1, B3, B5, etc. transmitted by CA and a further measurement point MP2' shall be provided on the connection CB to provide performance parameters relating to the blocks of packets B2, B4, B6, etc. transmitted by CB.

Then, if the packet transmission has been switched to the connection CA (step 601), the measurement point MP2/MP3 starts updating the performance parameter relating to the packets Pk transmitted by the connection CA (step 602*a*). In particular, if the performance parameter is the above cited counter c2A/c3A, the measurement point MP2/MP3 preferably increases by one the value of the counter c2A/c3A for each packet Pk received from the connection CA.

Otherwise, if the packet transmission has been switched to the connection CB (step 601), the measurement point MP2/MP3 starts updating the performance parameter relating to the packets Pk transmitted by the connection CB (step 602*b*). In particular, if the performance parameter is the above cited counter c2B/c3B, the measurement point MP2/MP3 preferably increases by one the value of the counter c2B/c3B for each packet Pk received from the connection CB.

Further, the measurement point MP2/MP3 preferably executes also the read instruction comprised in the received remote command RC2/RC3, by providing to the controller C the value of the performance parameter (in particular, of the counters c1A or c1B) specified by the read instruction (step 603).

Hence, by referring to the timing table TT of FIG. 3, upon reception of remote commands RC2 and RC3 generated when the time t* indicated by the timer of the controller C becomes equal to an even multiple of Tb, the measurement points MP2 and MP3 provides to the controller C the values of the counters c2B and c3B relating to packets Pk transmitted on the connection CB, which currently have constant values. Conversely, upon reception of remote commands RC2 and RC3 generated when the time t* indicated by the timer of the controller C becomes equal to an odd multiple of Tb, the measurement points MP2 and MP3 provide to the controller C the values of the counters c2A and c3A relating to packets Pk transmitted on the connection CA, which currently have constant values.

Also the execution of the read instruction by the measurement points MP2 and MP3 is preferably delayed by a safety wait time $T_{SW}$ as described above, in order to guarantee that the values of the counters c2A and c3A or c2B and c3B sent to the controller C are actually constant.

Hence, during every block period Tb the controller C receives from each measurement point MP1, MP2, MP3 the value of a counter c1A, c2A, c3A or c1B, c2B, c3B, which the controller C may then use for providing a performance measurement (in particular, a packet loss measurement) relating to that block period. The performance measurement for block periods whose start time is equal to an even multiple of Tb in particular is calculated using the received values of c1A, c2A and c3A, while the performance measurement for block periods whose start time is equal to an odd multiple of Tb is calculated using the received values of c1B, c2B and c3B.

For instance, for block periods whose start time is equal to an even multiple of Tb, a packet loss between the nodes N1 and N2 may be calculated as PL(12)=c1A–c2A, a packet loss between the nodes N2 and N3 may be calculated as PL(23)=c2A–c3A and a packet loss between the nodes N1 and N3 may be calculated as PL(13)=c1A–c3A.

It shall be noticed that, if each measurement point MP1, MP2, MP3 has initialized (namely, reset to zero) the values of the respective performance parameters upon reception of the respective first remote command RC1, RC2, RC3 from the controller C, the calculated performance measurements are valid since the beginning of the measurement session, namely from the first block period.

According to another variant, each measurement point MP1, MP2, MP3 does not reset the respective performance parameters upon reception of the respective first remote command RC1, RC2, RC3 from the controller C. In this case, the calculated performance measurements start being valid after the first two block periods Tb have lapsed (namely, one for each packet feature applied to the packet flow PF).

Hence, the periodic behavior of the nodes N1, N2, N3 involved in the performance measurement is not due to the nodes configuration, but is instead regulated by the remote commands RC1, RC2, RC3 that the controller C periodically sends to the nodes N1, N2, N3, which then apply the proper packet feature (the connection carrying the packet, in the described embodiment) and provides to the controller C the value of the proper performance parameter (a counter, in the described embodiment) in response to such remote commands, by executing the executable instructions comprised therein.

This is advantageous in that the nodes N1, N2, N3 do not need to be configured for the purpose of implementing the performance measurement. This makes the method of the invention easier to deploy than the configuration-based method of EP 2 636 185.

Besides, consistently with the SDN paradigm, the network manager may control and adjust the parameters of the performance measurement in a dynamic and flexible way. In particular, in order to change the value of Tb, no reconfiguration of the nodes N1, N2, N3 is required. The value of Tb may indeed by changed centrally at the controller C. This change will result in a change of the periodicity of the flow of remote commands RC1, RC2, RC3 issued by the controller C and, consequently, in a change of the periodicity of the behaviour of the nodes N1, N2 and N3. The value of Tb may therefore be adjusted as often as necessary, according to the needs arising in every specific network scenario.

Also other parameters of the measurement may be changed in the same way, e.g. the criteria for identifying the packet flow to be measured and/or the address to which the values of the performance parameters provided by the measurement points shall be sent.

The method of the invention exhibits further advantages.

First of all, it maintains full compliance with the method of EP 2 636 185. In particular, the network 100 may comprise nodes configured to operate according to EP 2 636 185 and nodes implementing instead the method according to embodiments of the present invention. A same node may also implement both the methods, the choice being of the network manager depending on the needs.

Moreover, the high flexibility in controlling and adjusting the measurement parameters allows implementing more complex performance measurement schemes.

For instance, the involved nodes may be remotely controlled to apply a certain block period Tb along a portion of the path followed by the packet flow to be measured and, at the same time, another block period Tb' along another portion of the path.

Figure 7:
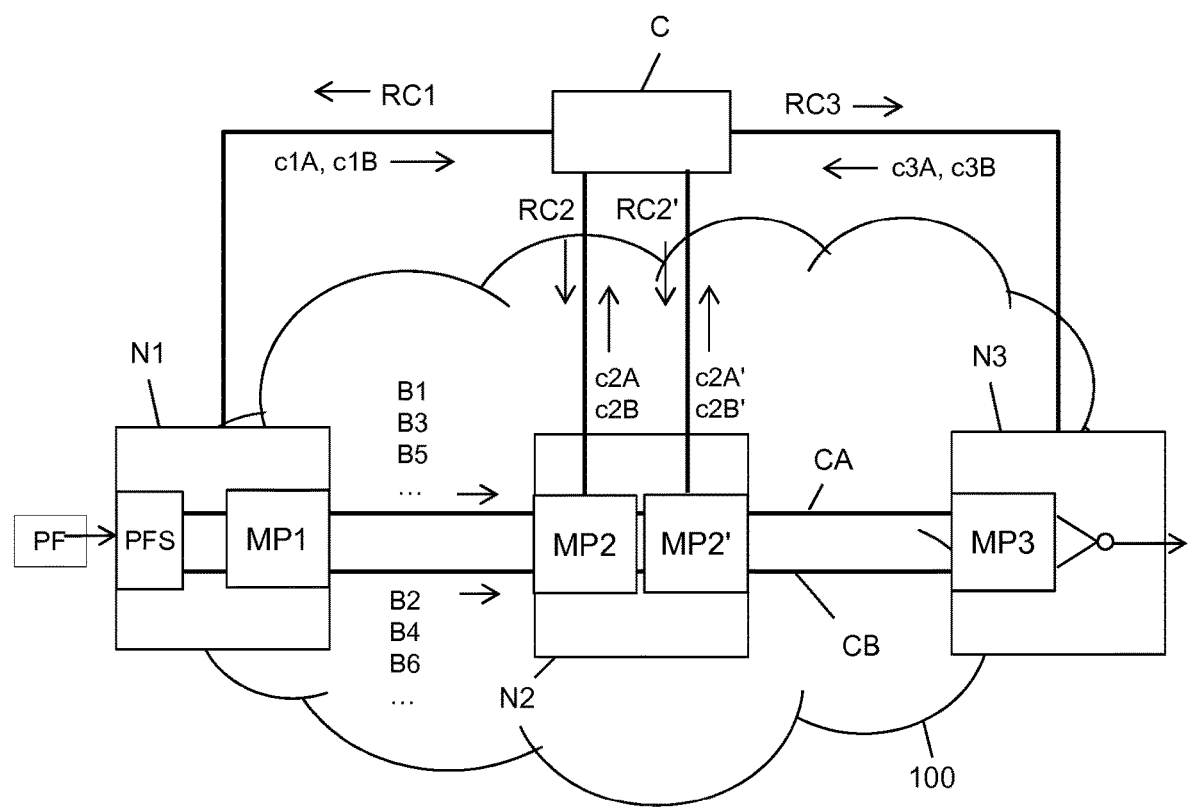
FIG. 7 schematically shows a packet-switched communication network in which the method for performing performance measurements according another embodiment of the present invention is implemented.

With reference for instance to the scenario of FIG. 7, a need may arise to increase the frequency of the performance measurement only between the nodes N1 and N2, for instance a measurement every Tb=1 minute is needed between N1 and N2, while Tb'=5 minutes is considered sufficient between N2 and N3. It is also assumed that at the node N2 two measurement points MP2, MP2' are implemented, one on the reception side and one on the transmission side, providing separate performance parameters relating to packets Pk as received from N1 and as transmitted to N3, respectively.

In this case, the controller C preferably transmits commands RC1 and RC2 to the nodes N1 and N2 each time the current time t as indicated its timer is equal to k×min{Tb, Tb'}. This way, the packet flow splitter PFS switches connection every Tb=1 minute and the measurement points MP1, MP2 transmit the values of the respective counters c1A/c2A or c1B/c2B to the controller every Tb=1 minute. Further, the controller C also preferably transmits commands RC2' and RC3 to the nodes N2 and N3 each time the current time t as indicated by its timer is equal to k×max{Tb, Tb'}, so that the measurement points MP2', MP3 provide the values of the respective counters c2A'/c3A or c2B'/c3B to the controller every Tb'=5 minutes.

This way, the controller C may perform a performance measurement between N1 and N2 every Tb=1 minute based on the counters c1A and c2A or c1B and c2B and a performance measurement between N2 and N3 every Tb'=5 minutes based on the counters c2A' and c3A or c2B' and c3B.

It may be appreciated, that, in order to provide correct measurements between N2 and N3, the block period Tb' used for gathering the performance parameter values from the measurement points shall be an integer multiple of the block period Tb used for switching connection. Further, the safety wait time $T_{SW}$ shall not exceed Tb at all the involved measurement points MP1, MP2, MP2' and MP3.

More generally, the measurement points may be operated to provide to the controller C the value(s) of their performance parameter(s) with a periodicity different from the period of the connection switching. The controller C may for instance send to the node N1 a flow of switch instructions with a period Tb equal to the minimum desired value (e.g. 10 seconds), so that the packet flow splitter PFS switches connection between CA and CB every 10 seconds. Then, the controller C may send to all the nodes comprising a measurement point a flow of read instructions with a period equal to any integer multiple of 10 seconds, e.g. 5 minutes. Upon detection of an event such as a sudden increase of the packet loss value, the controller C may quickly increase the measurement frequency by reducing the period of the read instructions to any desired integer multiple of 10 seconds, without changing the frequency of the connection switching.

The invention claimed is:

1. A method for performing a performance measurement on a packet flow transmitted through a packet-switched communication network, said method comprising:
   in said packet flow, providing first blocks of packets having a first packet feature and second blocks of packets having a second packet feature, said first blocks of packets alternating in time with said second blocks of packets, by periodically, at a block period, switching a packet feature in said packet flow;
   at each one of at least two measurement points located on the path of said packet flow, providing two performance parameters relating to said first blocks of packets and said second blocks of packets respectively, and alternately providing to a controller of said packet-switched communication network the values of said two performance parameters periodically, at a period equal to the block period; and performing said performance measurement based on said values of said two performance parameters received from said at least two measurement points, wherein each switching said packet feature and each providing one of said values of said two performance parameters is performed directly in response to a respective remote command comprised in a flow of remote commands received from said controller, and said flow of remote commands are sent by said controller at a period equal to the block period at which the packet feature is switched.

2. The method according to claim 1, wherein each remote command comprises one or more of:
a switch instruction configured to trigger a switching of said packet feature in said packet flow; and
a read instruction configured to trigger provision to said controller of a current value of one of said two performance parameters.

3. The method according to claim 2, wherein said controller sends, to a node of said packet-switched communication network implementing said providing, a switch instruction when, based on a local clock, it determines that said block period is starting and that, accordingly, said packet feature shall be switched in said packet flow.

4. The method according to claim 3, further comprising varying said block period at said controller.

5. The method according to claim 4, wherein said controller sends to said at least two measurement points located on the path of said packet flow respective read instructions periodically, at a period equal to said block period.

6. The method according to claim 5, wherein said switch instruction and said read instructions are sent by said controller to said node and to said at least two measurement points, respectively, substantially at the same time.

7. The method according to claim 6, wherein execution of said read instructions by said at least two measurement points is delayed by a safety wait time TSW relative to the reception times of said read instructions at said at least two measurement points.

8. The method according to claim 4, wherein said controller sends to measurement points located on at least a portion of the path of said packet flow respective read instructions periodically, at a period equal to an integer multiple of said block period.

9. The method according to claim 5, wherein said switch instruction and said read instructions are sent by said controller to said node and to said at least two measurement points, respectively, at different times, sending said read instructions being delayed by a safety wait time TSW relative to sending of said switch instruction.

10. The method according to claim 3, wherein said controller sends to said at least two measurement points located on the path of said packet flow respective read instructions periodically, at a period equal to said block period.

11. The method according to claim 10, wherein said switch instruction and said read instructions are sent by said controller to said node and to said at least two measurement points, respectively, substantially at the same time.

12. The method according to claim 11, wherein execution of said read instructions by said at least two measurement points is delayed by a safety wait time TSW relative to the reception times of said read instructions at said at least two measurement points.

13. The method according to claim 10, wherein said switch instruction and said read instructions are sent by said controller to said node and to said at least two measurement points, respectively, at different times, sending said read instructions being delayed by a safety wait time TSW relative to sending of said switch instruction.

14. The method according to claim 3, wherein said controller sends to measurement points located on at least a portion of the path of said packet flow respective read instructions periodically, at a period equal to an integer multiple of said block period.

15. A packet-switched communication network configured to implement a performance measurement on a packet flow transmitted through said packet-switched communication network, said network comprising:

a first node configured to provide, in said packet flow, first blocks of packets having a first packet feature and second blocks of packets having a second packet feature, said first blocks of packets alternating in time with said second blocks of packets, by periodically, at a block period, switching a packet feature in said packet flow;

at least two measurement points located on the path of said packet flow, each one of said at least two measurement points being configured to provide two performance parameters relating to said first blocks of packets and said second blocks of packets, respectively, and to alternately provided the values of said two performance parameters periodically, at a period equal to the block period; and a controller configured to perform said performance measurement based on said values of said two performance parameters received from said at least two measurement points, wherein said first node and said at least two measurement points are configured to periodically switch said packet feature and alternately provide said values of said two performance parameters, respectively, each switching and each providing being performed directly in response to a respective remote command comprised in a flow of remote commands received from said controller, and said controller is configured to send said flow of remote commands at a period equal to the block period at which the packet feature is switched.

* * * * *